United States Patent
Mayor et al.

(10) Patent No.: US 8,918,103 B2
(45) Date of Patent: *Dec. 23, 2014

(54) LOCATION DATA REGRESSION

(71) Applicant: Apple Inc., Cupertino, CA (US)

(72) Inventors: Robert Mayor, Half Moon Bay, CA (US); Lukas M. Marti, Santa Clara, CA (US); Tadaaki Shimada, San Jose, CA (US); Yefim Grosman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/715,413

(22) Filed: Dec. 14, 2012

(65) Prior Publication Data

US 2014/0171126 A1  Jun. 19, 2014

(51) Int. Cl.
*H04W 4/00* (2009.01)
*G01S 5/14* (2006.01)
*H04W 4/02* (2009.01)
*H04W 64/00* (2009.01)

(52) U.S. Cl.
CPC .............. *H04W 4/023* (2013.01); *G01S 5/14* (2013.01); *H04W 64/00* (2013.01)
USPC ............ 455/435.2; 455/456.6; 455/436; 455/444; 455/420; 455/421; 370/328; 370/331; 370/332

(58) Field of Classification Search
CPC .......... G01S 5/14; H04W 4/023; H04W 64/00
USPC ............. 455/404.2, 456.1, 456.5, 456.6, 457, 455/556.2, 561, 550.1; 370/328, 338, 331, 370/332
See application file for complete search history.

(56) References Cited

U.S. PATENT DOCUMENTS

| | | | |
|---|---|---|---|
| 2009/0298505 A1 | 12/2009 | Drane et al. | |
| 2010/0159958 A1 | 6/2010 | Naguib et al. | |
| 2011/0065457 A1* | 3/2011 | Moeglein et al. | 455/456.6 |
| 2011/0246148 A1 | 10/2011 | Gupta et al. | |
| 2011/0250903 A1 | 10/2011 | Huang et al. | |
| 2013/0143597 A1* | 6/2013 | Mitsuya et al. | 455/456.1 |

FOREIGN PATENT DOCUMENTS

| | | |
|---|---|---|
| JP | 2002077976 | 3/2002 |
| WO | WO 2012/032725 | 3/2012 |

OTHER PUBLICATIONS

International Search Report and Written Opinion of the International Searching Authority, PCT Application Serial No. PCT/US2013/071661, Feb. 14, 2014, 16 pp.

\* cited by examiner

*Primary Examiner* — Babar Sarwar
(74) *Attorney, Agent, or Firm* — Fish & Richardson P.C.

(57) ABSTRACT

A server can receive, from a mobile device, a reference location and one or more measurements of signal from signal sources. Each signal source is associated with a signal source location in a location database. The server can use the measurements and the signal source locations to validate the reference location. The server can use the validated reference location to validate the signal source locations, including detecting moved signal sources.

27 Claims, 9 Drawing Sheets

LOCATION DATA REGRESSION

TECHNICAL FIELD

This disclosure relates generally to location determination.

BACKGROUND

Some mobile devices have features for determining a geographic location. For example, a mobile device can include a receiver for receiving signals from a global satellite system (e.g., global positioning system or GPS). The mobile device can determine a geographic location, including latitude and longitude, using the received GPS signals. In many places, GPS signals can be non-existent, weak, or subject to interference, such that it is not possible to determine a location using the GPS functions of a mobile device accurately. In such cases, the mobile device can determine its location using other technologies. For example, if the location of a wireless access gateway (e.g., a cellular tower) is known, and a mobile device can detect the wireless access gateway, the mobile device can then estimate a current location using a location of the detected wireless access gateway. The location of wireless access gateways can be stored in a location database.

SUMMARY

Methods, program products, and systems for location data regression are described. Location regression can be used to maintain a crowd-sourced location database, including validating system performance of the location database, detect outliers, and prototype and evaluate new procedures for determining a location of a mobile device.

In one respect, a server can receive, from a mobile device, a reference location and signal measurements from one or more signal sources. The signal sources can be associated with identifiers of the signal sources. Each signal source can have a pre-specified location. The server, or the mobile device, can provide a location estimate of the mobile device using locations of the signal sources as stored in a location database. The reference location and the location estimate can be independent of each other. For example, the reference location can be determined by GPS functions of the mobile device. The server can compare the location estimate, the location of each signal source, and the device location and determine whether the reference location is valid, whether the location estimate is valid, and whether a subset of the signal sources is wrong. The server can update the location database accordingly.

The server can validate a reference location, a location estimate, and individual signal sources. By validating the reference location, the server can identify errors from GPS data received from mobile devices. By validating the location estimate, the server can evaluate different algorithms for estimating locations of mobile devices. By validating the signal sources, the server can identify signal sources (e.g., wireless access points) that has moved and thus associated with outdated location information. In general, by performing these validations, the server can prevent errors in GPS data and moved signal sources from being used in estimating locations of mobile devices in subsequent calculations.

The location data regression techniques can be implemented to achieve the following advantages. Compared to a conventional location service, a location service using location data regression can maintain data integrity better. The better data integrity, in turn, can achieve higher degree of accuracy in location estimation. A location service can use reference points for determining locations. For example, the location reference points can be wireless access points. The location service can provide the wireless access points, and locations associated with the wireless access points, to mobile devices such that the mobile devices can use the wireless access points to estimate a current location. The location service can determine the locations associated with the wireless access points using crowd sourcing, e.g., by receiving GPS locations associated with sampling devices that can detect the wireless access points. The GPS locations may be inaccurate, leading to inaccurate locations of the wireless access points. Using location data regression, the location service can identify the inaccurate GPS locations, which can cause the locations associated with the wireless access points to be more precise.

Compared to a conventional location service, a location service using location data regression can be more reliable. For example, a location server can provide locations of wireless access points to mobile devices such that the mobile devices can estimate locations using the locations of wireless access points. A wireless access point can move. In conventional location service, the location server may not detect movement of the wireless access point. Accordingly, the location provided to a mobile device may be inaccurate, leading to an incorrect location estimate. By employing location data regression, the location server can detect the movement, and change the location of the wireless access point, or preventing a mobile device from using the moved wireless access point to perform location estimate, thus reducing the likelihood of incorrect location estimate.

Compared to a conventional location service, a location service using location data regression can be more scalable. New location estimation technologies can be tested and evaluated using location data regression and existing data of reference points and their respective locations, thereby reducing the need for a complete repopulation of a location database when a new technology is applied.

The details of one or more implementations of location data regression are set forth in the accompanying drawings and the description below. Other features, aspects, and advantages of location data regression will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
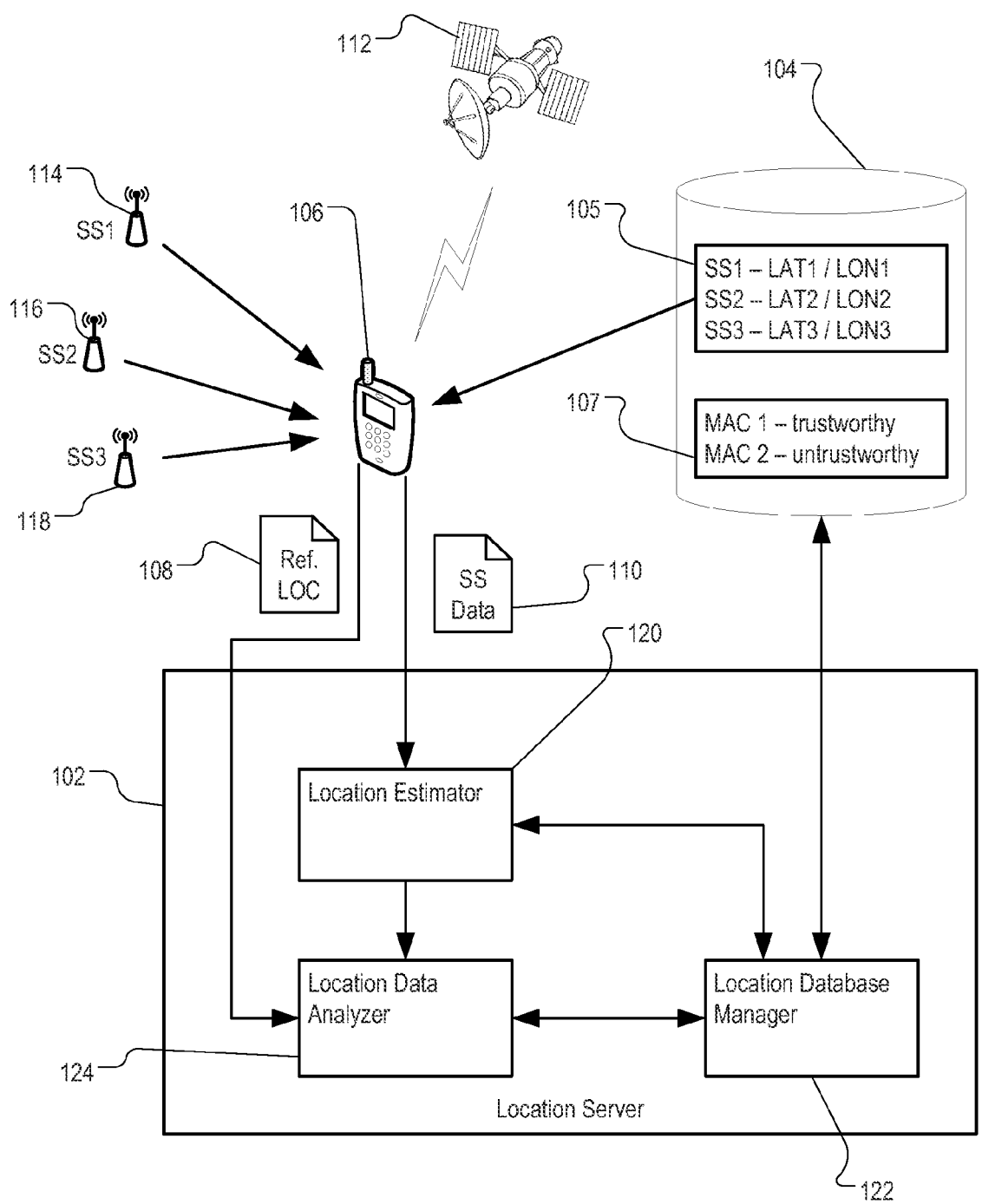
FIG. 1 is a block diagram providing an overview of location data regression.

FIG. 1 is a block diagram providing an overview of location data regression. Location server 102 can include one or more computers programmed to perform location data regression analysis on existing location data 104 using information more recent than location data 104. The recent information can include information received from mobile device 106. The location data regression analysis can improve quality of location data 104.

The information from mobile device 106 can include reference location 108 and signal source data 110. Reference location 108 can be a location estimate of mobile device 106 at a given time (time T) that is deemed most trustworthy by mobile device 106. Mobile device 106 can determine reference location 108 using global satellite system (e.g., GPS) signals received by mobile device 106 from satellites 112. Signal source data 110 can include identifiers of one or more signal sources detected by mobile device 106 at time T. For example, at time T, mobile device 106 can detect radio frequency (RF) signals from signal sources (e.g., wireless access points) 114, 116, and 118. Mobile device 106 can submit identifiers of signal sources 114, 116, and 118 ("SS1," "SS2," and "SS3") to location server in signal source data 110.

In some implementations, mobile device 106 can store location data of signal sources 114, 116, and 118. The location data can be received from location server 102. Mobile device 106 can determine an estimated location using the location data. Mobile device 106 can submit the estimated location in signal source data 110.

Location estimator 120 of location server 102 can receive signal source data 110. Location estimator 120 is a component of location server 102 configured to estimate a location of mobile device 106 based on signal source data 110. Location estimator 120 can estimate the location of mobile device 106 by performing calculations using a probability density function (PDF). The PDF can be a multi-modal function of a probability distribution f(x) indicating a probability that mobile device 106 is located at a distance x from a given location (e.g., a location of signal source 114, 116, or 118). Location estimator 120 can determine the PDF using location data 104. Location data 104 can be stored in a database that is a part of or coupled to location server 102. Location estimator 120 can communicate with the database through location database manager 122. Location data 104 can include signal source location data 105 and device trustworthiness data 107. Signal source location data 105 can include location coordinates (e.g., latitudes, longitudes, and altitudes) of location signal sources. Device trustworthiness data 107 can include information on whether a location signal source or a mobile device is considered trustworthy.

Location estimator 120 can determine an estimated location of mobile device 106 using a procedure that is different from a procedure used by mobile device 106 to estimate a location using signal sources 114, 116, and 118. For example, location estimator 120 can use a different PDF.

Location estimator 120 can provide the estimated location data analyzer 124. Location data analyzer 124 is a component of location server 102 configured to analyze information from mobile device 106 and location data 104 to determine (1) whether the information from mobile device 106 is trustworthy, and (2) whether location data 104 are trustworthy.

To determine whether the information from mobile device 106 is trustworthy, location data analyzer 124 can compare reference location 108 with a location of each of the signal sources. If a distance between reference location 108 and at least one location of a signal source detected by mobile device 106 is below a threshold, then location data analyzer 124 can determine that reference location 108 is trustworthy. The threshold can be X kilometers, where the value X can be determined based on a type or power of the corresponding signal source.

In some implementations, to determine whether the information from mobile device 106 is trustworthy, location data analyzer 124 can compare reference location 108 with the estimated location of mobile device 106 as provided by location estimator 120. If reference location 108 matches the estimated location (e.g., a difference between the two locations is smaller than a threshold), location data analyzer can determine that reference location 108 is trustworthy. Upon determining that reference location 108 is trustworthy, location data analyzer 124 can store, through location database manager 122, an identifier of mobile device 106 (e.g., a media access control (MAC) address of mobile device 106), in a location database. The identifier can be marked as trustworthy.

If location data analyzer 124 determines that reference location 108 matches the estimated location (e.g., a difference between the two locations reaches or exceeds a threshold), location data analyzer 124 can designate reference location 108 as a truth reference. Location data analyzer can use the truth reference to determine if signal source data 110 are sufficiently reliable. Location data analyzer 124 can determine whether signal source data 110 are sufficiently reliable by determining if any signal source identified in signal source data 110 is an outlier. A signal source can be an outlier if reference location 108 is determined to be trustworthy and a distance between a recorded location of the signal source and reference location 108 exceeds a threshold. If a signal source is determined to be an outlier for a sufficient number of times, location data analyzer 124 can "blacklist" the signal source and prevent the signal source being used in future location estimation.

If location data analyzer 124 determines that signal source data 110 is sufficiently reliable, or that no signal source is located within a threshold distance from reference location 108, location data analyzer 124 can determine that reference location 108, which does not match a location of mobile device 106 as estimated based on signal source data 110, is not trustworthy. Location data analyzer 124 can store this information as location data 104 in the location database. In addition, location data analyzer 124 can determine, based on information in location data 104, whether the mismatch is an occasional occurrence (e.g., a one-time glitch) or a frequent occurrence (e.g., has occurred a number of times that exceed a threshold). Location data analyzer 124 can store an identifier as location data 104 and mark the identifier as untrustworthy. Location server 102 can prevent a mobile device marked as untrustworthy from future crowd sourcing (e.g., for location sampling or for location data regression analysis).

If location data analyzer 124 determines that signal source data 110 is not sufficiently reliable, location data analyzer 124 can determine if location data 104 can be updated. Location data analyzer 124 can determine if the mismatch is caused by an outlier in location data 104. An outlier can be a signal source whose location, according to location data 104, is so far away that mobile device 106 should not have detected a signal from the signal source. If location data analyzer 124 determines that an outlier exists, location data analyzer 124 can update location data 104, including removing the outlier from location data 104, modify location associated with the outlier, or blacklist the outlier for further verification.

In addition, location data analyzer 124 can update location data 104 when a new signal source is detected by mobile device 106. When location data analyzer 124 determines that signal source data 110 includes identifier of a signal source that does not exist in location data 104, location data analyzer 124 can store the identifier as temporary location data, until location data analyzer 124 receives sufficient confirmation (e.g., information from more than a given number of other mobile devices). Once location data analyzer 124 confirms the new signal source, location data analyzer 124 can add the identifier and estimated location of the identifier to location data 104. Location server 102 can provide location data 104 to mobile device 106 for location determination.

The operations performed by location server 102 and mobile device 106 can be repeated. Location server 102 can receive information from multiple mobile devices. Location server 102 can update location data 104 periodically (e.g., every day). When the location data are large, and mobile devices are numerous, each time the operations are performed, one or more outliers can be identified, and one or more mobile devices can be blacklisted.

Outlier Identification

Figure 2:
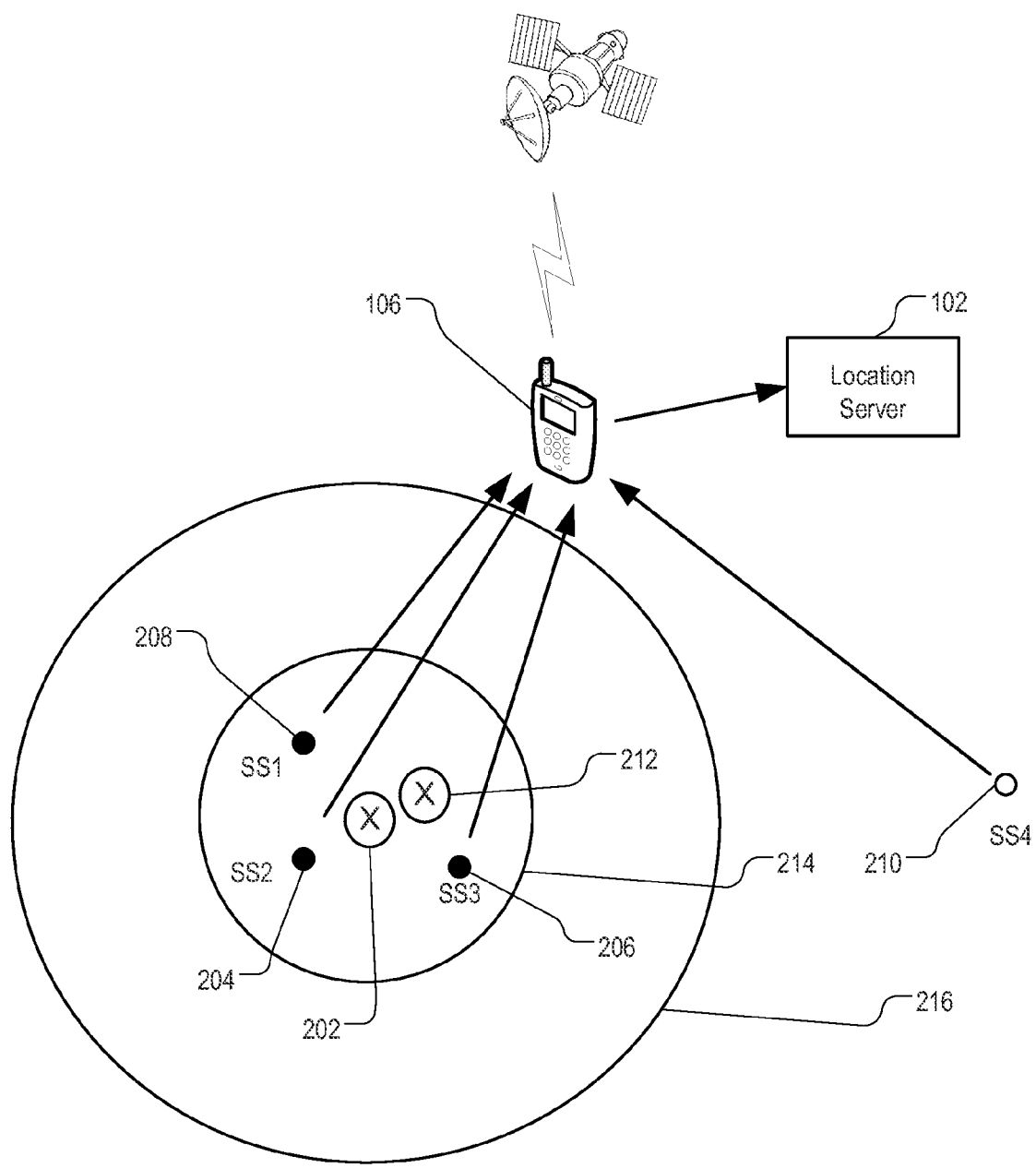
FIG. 2 illustrates exemplary operations of identifying an outlier among location reference points.

FIG. 2 illustrates exemplary operations of identifying an outlier among location reference points. Location server 102 can receive reference location 202 and signal source data from mobile device 106. Reference location 202 can be a location determined by GPS signals received by mobile device 106. Based on the signal source data, location server 102 can determine that mobile device 106 can detect signal from signal sources 204, 206, 208, and 210. Location server 102 can determine, from location data, a geographic location of each of signal sources 204, 206, 208, and 210.

Location server 102 can determine estimated location 212 of mobile device 106 based on the geographic locations of signal sources 204, 206, 208, and 210 using PDF. Location server 102 can determine that a distance between reference location 202 and estimated location 212 is less than error threshold 214. Location server 102 can then determine that reference location 202 is trustworthy. The distance can be a Euclidean distance.

In some implementations, location server 102 can determine that a distance between reference location 202 and at least one location of signal source 204, 206, 208, or 210 is less than a signal source threshold. Location server 102 can then determine that reference location 202 is trustworthy.

Location server 102 can determine, based on a transmission range of each of signal sources 204, 206, 208, and 210, maximum detection area 216. Maximum detection area 216 can be a geographic area where, if a signal source is located in the geographic area, mobile device 106 can detect a signal from that signal source. For example, when signal sources 204, 206, 208, and 210 are wireless access points, maximum detection area 216 can be a circle centered at reference location 202 and having a radius corresponding to a transmission range of a wireless access point (e.g., five kilometers). The shape and size of maximum detection area 216 can vary based on known obstacles near reference location 202 (e.g., highrise buildings or hills). The radius of maximum detection area 216 can vary based on a type of signal sources 204, 206, 208, and 210. For example, when signal sources 204, 206, 208, and 210 are Bluetooth devices, the radius can be less than 20 meters. The signal source threshold can correspond to maximum detection area 216.

Location server 102 can determine, based on the geographic location of signal source 210 and maximum detection area 216, that mobile device 106 cannot detect a signal from signal source 210. However, signal source data received from mobile device 106 may indicate that mobile device 106 is capable of detecting a signal from signal source 210 nonetheless. Location server 102 can determine a conflict exists. Upon determining that conflict exists, location server 102 can perform an additional confirmation by determining that mobile device 106 is located near a cluster of signal sources. The cluster of signal sources can be a set of a sufficient number of signal sources located sufficiently close to one another such that if a mobile device can detect a signal from each of the signal sources in the set, the probability is high that the mobile device is close to each of the signal sources in the set or to a cluster location that is determined by the locations of the signal sources.

In this example, location server 102 can determine that a Euclidean distance between mobile device 106 and cluster location determined based on geographic locations of signal sources 204, 206, and 208 is less than a threshold. Upon such determination, location server 102 can determine that signal source 210 is an outlier, and that a location of signal source 210, as stored in location data, needs update. Location server 102 can then update the location data, for example, by removing signal source 210 or associating signal source 210 with a new location. Location server 102 can determine the new location based on reference location 202 and other trustworthy reference locations received from other mobile devices that can detect signal source 210

Figure 3:
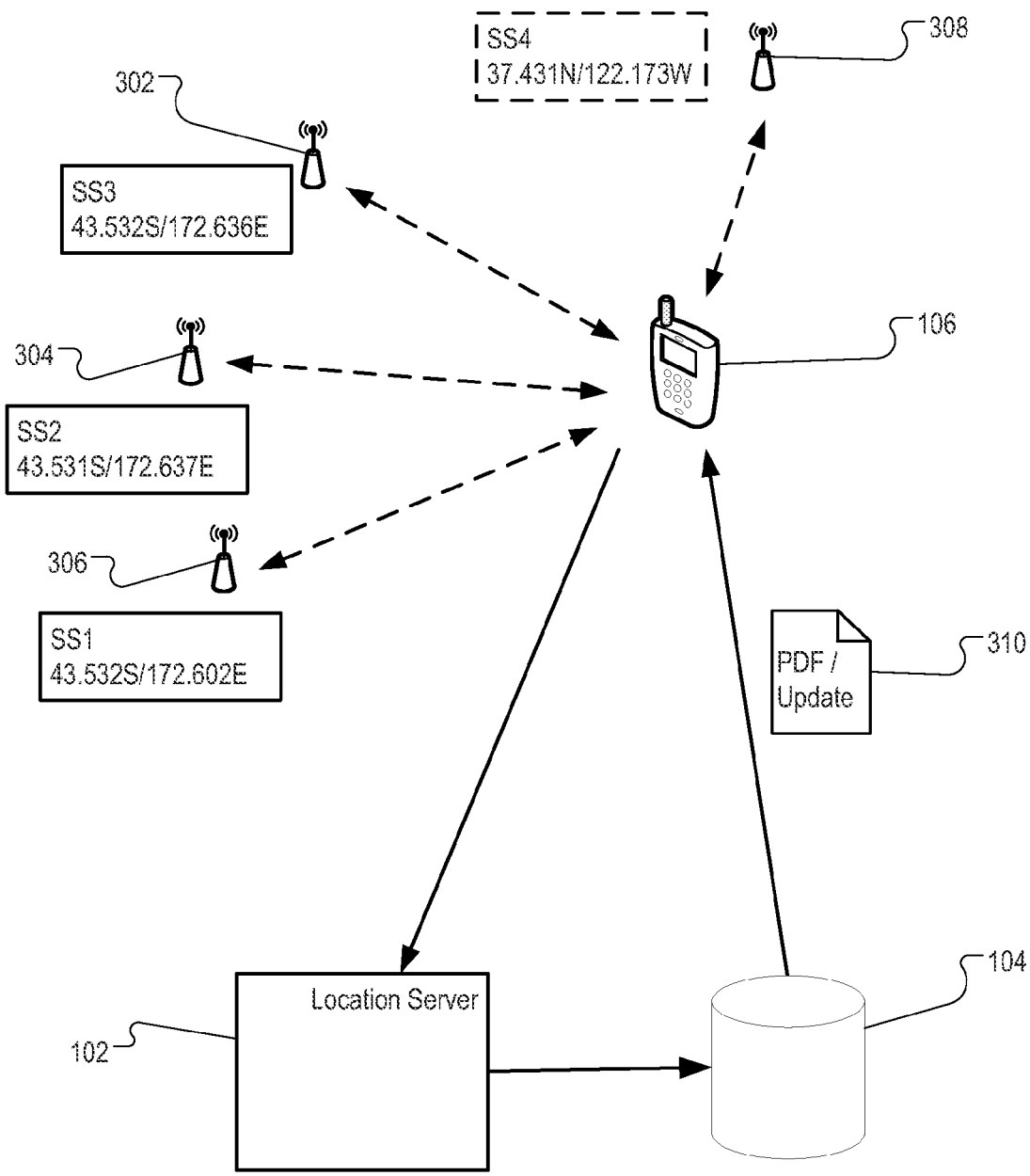
FIG. 3 illustrates exemplary techniques for updating location data on a mobile device based on a regression.

FIG. 3 illustrates exemplary techniques for updating location data on a mobile device based on a regression. Mobile device 106 can detect signal from signal sources 302, 304, 306, and 308. Mobile device 106 can identify signal sources 302, 304, 306, and 308 from a database local to mobile device 106. The local database can include location data of one or more areas that mobile device 106 has visited. The location data stored in the database local to mobile device can be previously provided to mobile device 106 by location server 102, which has access to comprehensive location data (e.g., location data for all known signal sources).

In the location database on mobile device 106, each of signal sources 302, 304, 306, and 308 can be represented using a unique identifier (e.g., a MAC address). Each of the identifiers can be associated with a location of the corresponding signal source. Mobile device 106 can estimate a current location of mobile device 106 based on PDF. The procedures for estimating the current location using PDF can be provided to mobile device 106 by location server 102.

Mobile device 106 can submit identifiers of signal sources 302, 304, 306, and 308 to location server 102. Location server 102 can determine that signal sources 302, 304, and 306 are located in a cluster. For example, location server 102 can determine that, according to location data 104, each of signal sources 302, 304, and 306 is located within reach (e.g., communication range) of one another; it is possible for mobile device 106 to detect signals from signal sources 302, 304, and 306.

In addition, location server 102 can determine that, according to location data 104, mobile device 106 should not have detected signal source 308. Location server 102 can determine that a location of mobile device 106, as estimated by location server 102, is trustworthy. Location server 102 can revised location data 104, e.g., by removing an identifier of signal source 308 from location calculation. Location server 102 can send update 310 to mobile device 106. Update 310 can include instructions for removing signal source 308 from future location estimation.

Location server 102 can evaluate different location estimate procedures and different PDFs. When location server 102 determines that a particular new procedure or PDF is better than the one currently used, location server 102 can automatically replace the currently used procedure or PDF with the new procedure or PDF. For example, location server 102 can receive a reference location and an estimated location (first location estimate) from mobile device 106. Location server can determine an estimated location (second location estimate) using a new procedure or PDF. Location server 102 can determine that the second location estimate is closer to the reference location than the first location estimate is, indicating the second location estimate is better than the first location estimate. When for each of a sufficient number of mobile devices, the second location estimate is better than the first location estimate, location server 102 can determine that the new procedure of PDF is better than the procedure and PDF currently used by the mobile device. Location server 102 can send the new procedure or PDF to mobile device 106 as part of update 310. Additional details on evaluating a PDF will be described below in reference to FIG. 4.

Improving Location Estimation Using Regression

Figure 4:
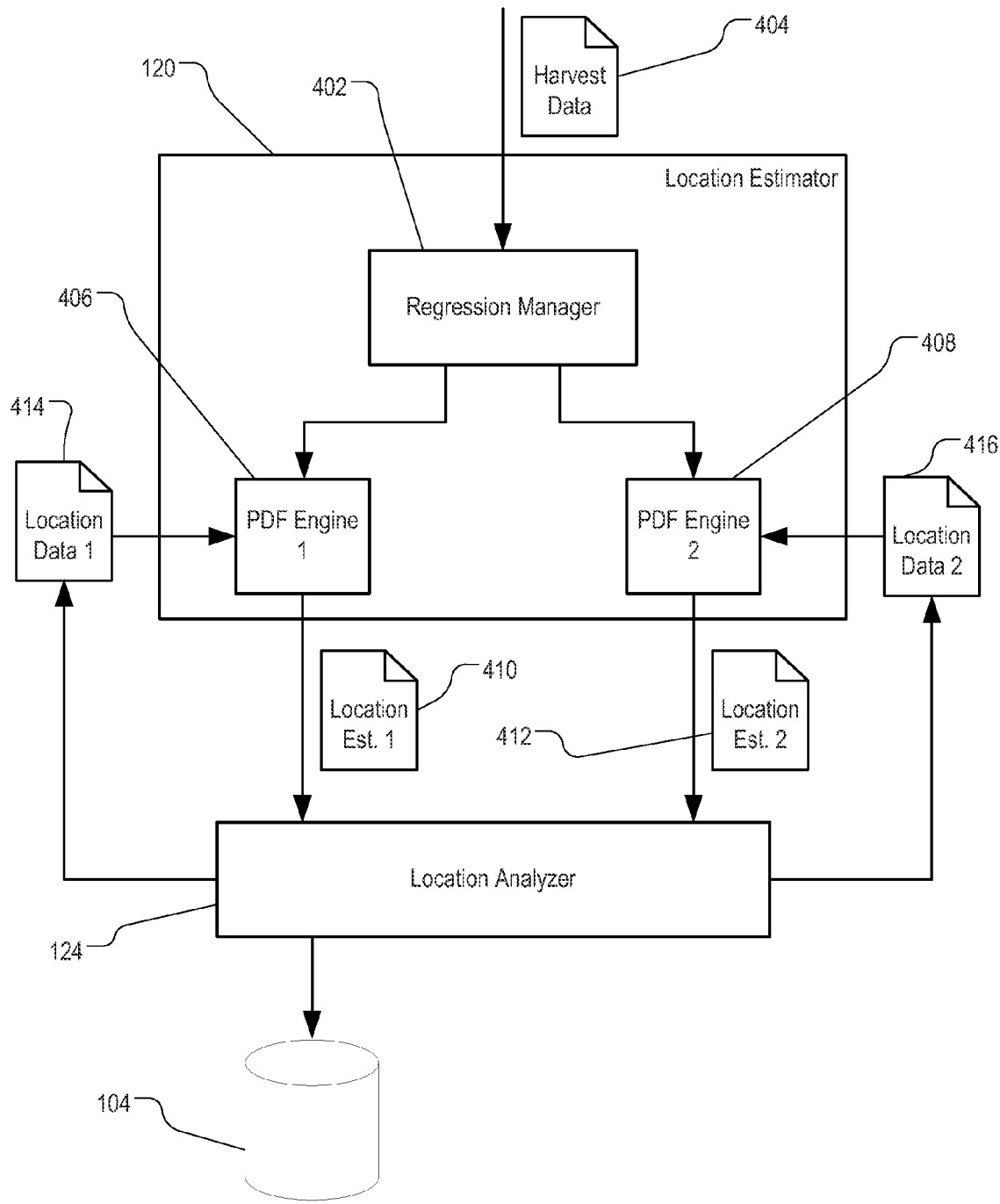
FIG. 4 is a block diagram illustrating exemplary techniques of using regression to evaluate different location estimation processes.

FIG. 4 is a block diagram illustrating exemplary techniques of using regression to evaluate different location estimation processes. Location estimator 120 and location data analyzer 124 of location server (as described in reference to FIG. 1) can be utilized to evaluate different location estimation processes and improve location estimation by identifying better process or PDF. The better process or PDF can be used by mobile devices to estimate their locations, as well as by location server 102 to generate better location data 104.

Location estimator 120 can include regression manager 402. Regression manager 402 can be a component of location estimator 120 configured to receive information from mobile devices and apply different location estimates to the received information. Regression manager 402 can receive harvest data 404. Harvest data 404 can include aggregated signal source data and reference locations from multiple mobile devices.

Regression manager 402 can provide harvest data 404 to first PDF engine 406 and second PDF engine 408. First PDF engine 406 and second PDF engine 408 can be components of location estimator 120 configured to apply different procedures or PDFs to harvest data 404. Using the different procedures or PDFs, first PDF engine 406 and second PDF engine 408 can generate first location estimate 410 and second location estimate 412, respectively. Each of first location estimate 410 and second location estimate 412 can include (1) location estimates of mobile devices that provide the harvest data and (2) location estimates of the signal sources. First PDF engine 406 and second PDF engine 408 can generate the location estimates of the signal sources using the reference locations in harvest data 404. For example, first PDF engine 406 and second PDF engine 408 can determine that N mobile devices M1 ... Mn each having a reference location L1 ... Ln detected a signal source S. Based on the reference locations, first PDF engine 406 and second PDF engine 408 each can determine a probable location of S, SL1, and SL2. Each of the probable locations SL1 and SL2 can be a PDF including a discrete or continuous probability density of S being located at various locations.

First PDF engine 406 and second PDF engine 408 can provide first location estimate 410 and second location estimate 412 to location data analyzer 124. Location data analyzer 124 can evaluate first location estimate 410 and second location estimate 412 using reference locations in harvest data 404, and determine comparative information on performances of first PDF engine 406 and second PDF engine 408. The information can include, for example, mean and variance of accuracy of the processes or PDFs used and of the signal source used, availability of the signal sources, maximum error, and reach of individual signal sources. Location data analyzer 124 can generate statistics on outliers in the reference locations (e.g., GPS outliers), and outliers in the signal sources (e.g., wireless access points or cell towers).

In some implementations, location data analyzer 124 can provide analysis of algorithm performance of cellular location services. The algorithms being analyzed can include cell identifier based location determination, neighbor cell based location determination, advanced forward link trilateration (AFLT), or other time difference of arrival (TDOA) or received signal strength indication (RSSI) based algorithm of location determination.

Location data analyzer 124 can provide feedback data 414 and feedback data 416 to first PDF engine 406 and second PDF engine 408, respectively. Each of feedback data 414 and feedback data 416 can include locations of signal sources revised based on first location estimate 410 and second location estimate 412, respectively. First PDF engine 406 and second PDF engine 408. The revisions can include updated location data, signal sources marked as outliers, and reference locations marked as outliers. First PDF engine 406 and second PDF engine 408 can repeat the operations using feedback data 414 and feedback data 416, respectively. Location data analyzer 124 can identify a better process, and better signal source locations in each repetition. Location data analyzer 124 can update location data 104 using the best signal source locations.

Figure 5:
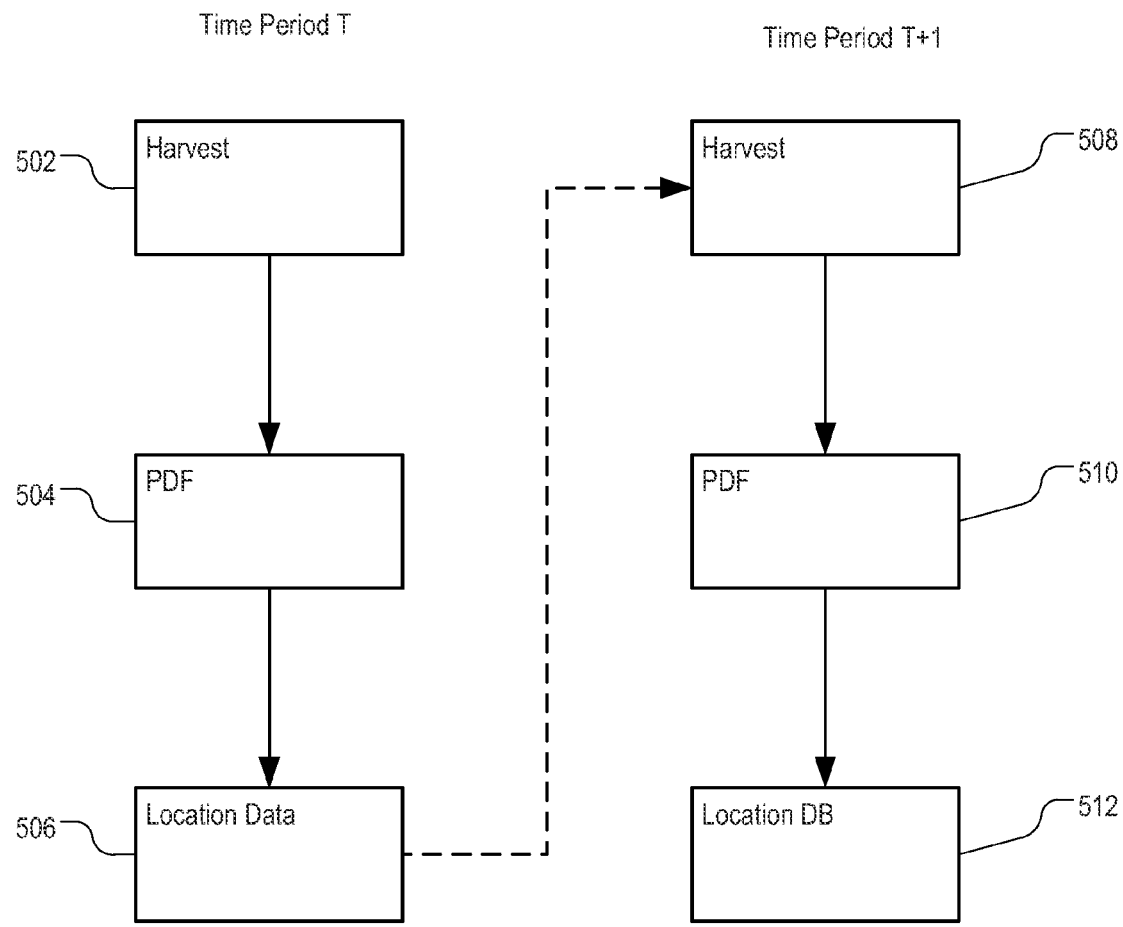
FIG. 5 is a block diagram illustrating exemplary techniques of using regression in maintaining data integrity in a location database.

FIG. 5 is a block diagram illustrating exemplary techniques of using regression in maintaining data integrity in a location database. During time period T (e.g., day 1) a location server (e.g., location server 102 of FIG. 1) can receive harvest data 502. The location server can analyze the harvest data, and determine locations for signal sources represented in harvest data 502. The locations can be represented as PDF data 504 for the signal sources. The location server can use PDF data 504 to update location data 506 in a location database.

During time period T+1 (e.g., day 2), the location server can use location data 506 in the location database, which was already updated, to estimate locations of mobile device. The location server can receive harvest data 508, which can be submitted from the same mobile devices that submitted harvest data 502 or different mobile device. The location can determine locations for signal sources represented in harvest data 508. The locations can be represented as PDF data 510 for the signal sources. The location server can use PDF data 504 to update location data 512 in the location database. Location data 512 can include updated location data 506. The operations of harvesting, location generation, and data update can repeat periodically.

Exemplary Processes

Figure 6:
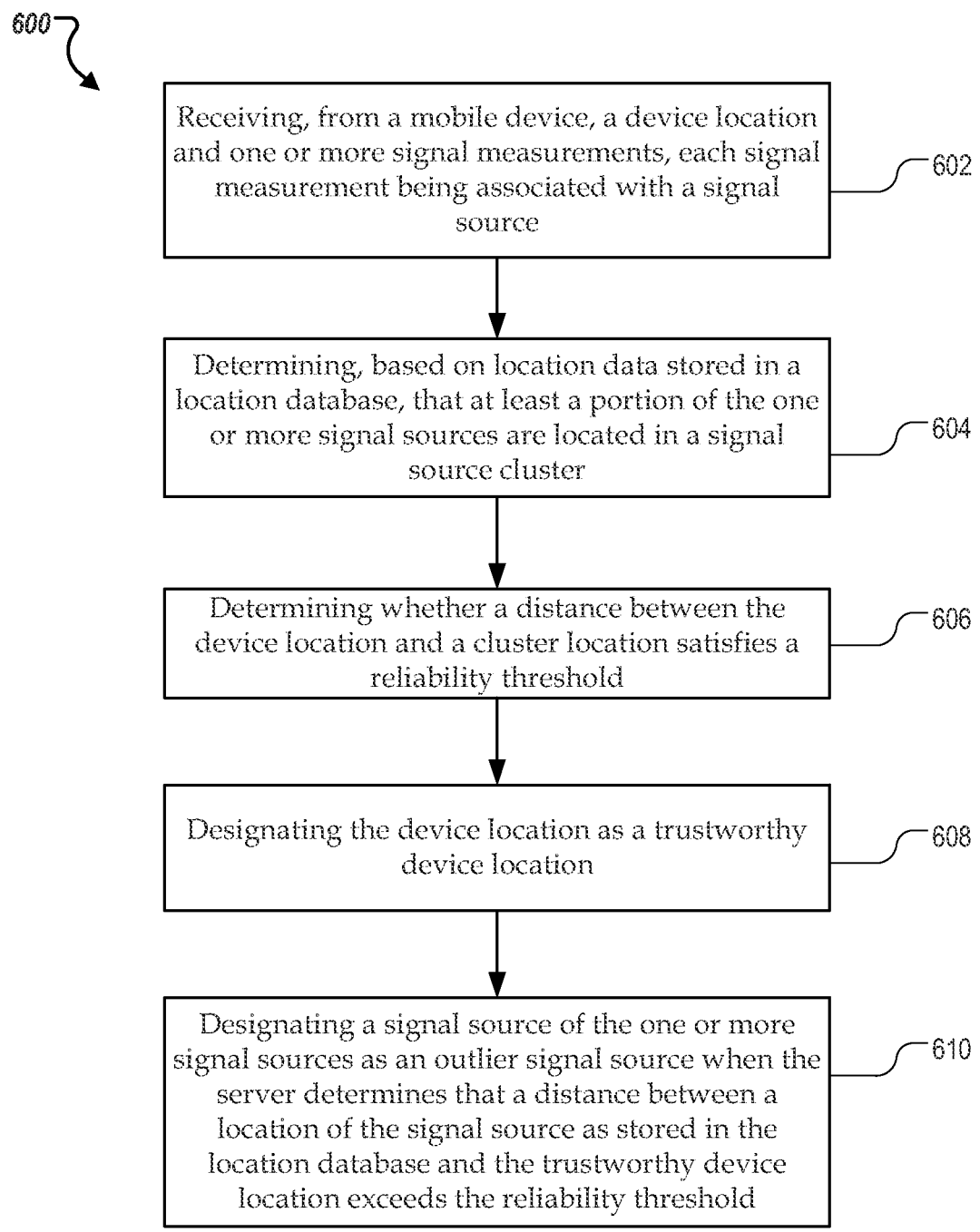
FIG. 6 is a flowchart of an exemplary procedure of location data regression.

FIG. 6 is a flowchart of exemplary procedure 600 of location data regression. Procedure 600 can be performed by a location server (e.g., location server 102 of FIG. 1).

The location server can receive (602), from a mobile device (e.g., mobile device 106 of FIG. 1), a device location and one or more signal measurements. The device location can be a geographic location of the mobile device determined based on one or more global satellite system (e.g., GPS) signals received by the mobile device. Each signal measurement can be associated with a signal source. Each signal source can be a radio frequency (RF) signal source (e.g., a wireless access point or a cellular tower), a magnetic signal source, an audio signal source, a visual signal source (e.g., a light source), or a heat source. The measurement can include a magnitude or variance of a signal from the signal source, or a round trip time of communication between the mobile device and the signal source.

The location server can determine (604), based on location data stored in a location database, that at least a portion of the one or more signal sources are located in a signal source cluster. The location data can be location data 104 as described above in reference to FIG. 1. The location data comprise an identifier of each signal source and an estimated location of each signal source. The estimated location can be determined based on signal measurement previously received from one or more crowd-sourced mobile devices. Determining that the one or more signal sources are located in the signal source cluster can include determining that a distance between each two signal sources in the signal source cluster satisfies a reliability threshold. The reliability threshold can be a reach of each signal source.

The location server can determine (606) whether a distance between the device location and a location of at least one signal source in the cluster satisfies a threshold. The distance can be a Euclidean distance.

Upon determining that the distance between the device location and the location satisfies a reliability threshold, the location server can designate (608) the device location as a trustworthy device location.

The location server can designate (610) a signal source of the one or more signal sources as an outlier signal source when the server determines that a distance between a location of the signal source as stored in the location database and the trustworthy device location exceeds the reliability threshold.

In some implementations, the location server can determine an estimated location of the mobile device using the one or more signal measurements and the location data. The location server can determine that a distance between the estimated location and the received device location exceeds the reliability threshold. Upon such determination, the location server can designate the mobile device as a suspect mobile device. The location server can prevent device locations received from the suspect mobile device from being used to estimate a location of a signal source.

Exemplary System Architecture

Figure 7:
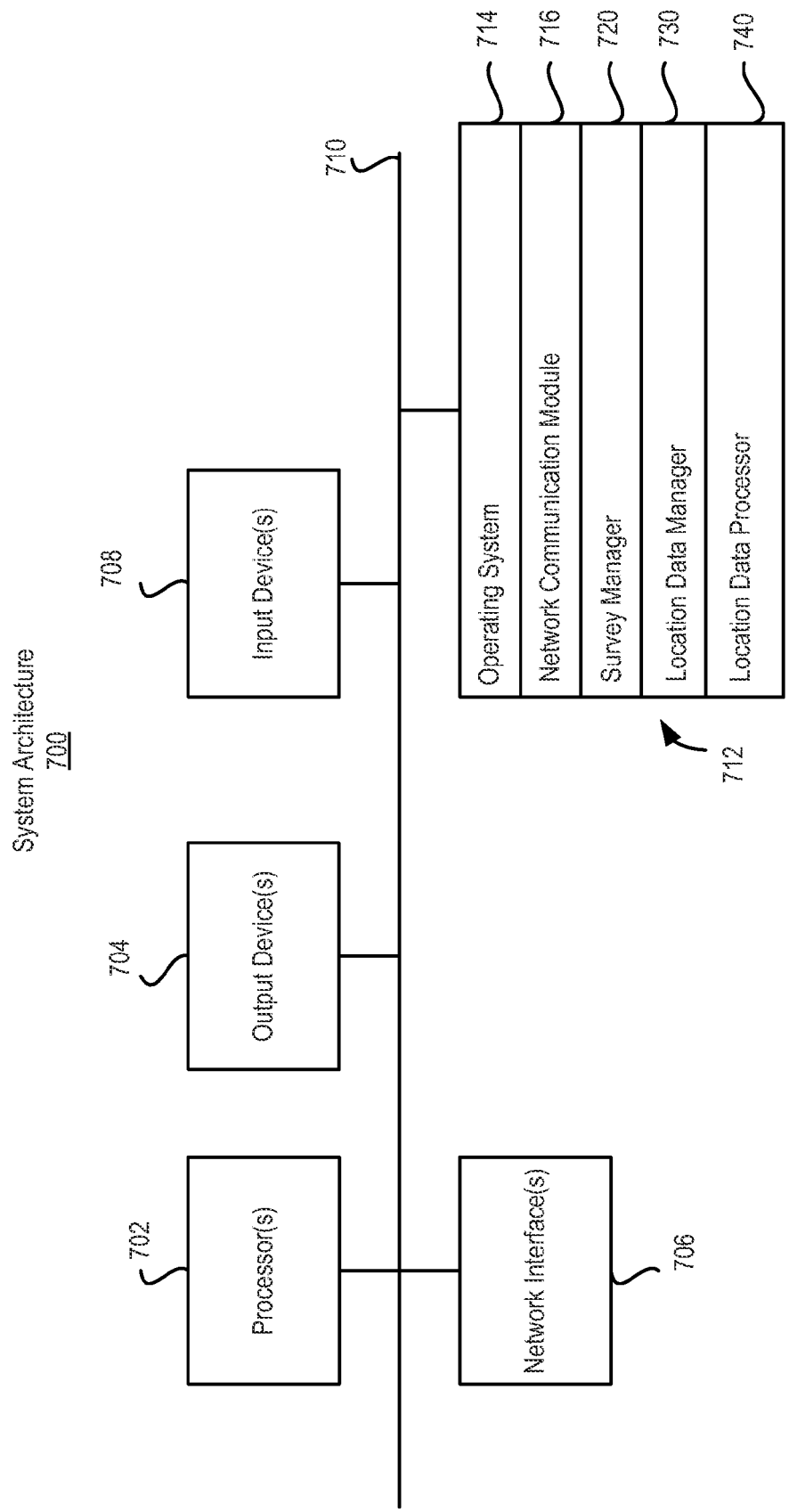
FIG. 7 is a block diagram of an exemplary system architecture for implementing the features and operations of FIGS. 1-6.

FIG. 7 is a block diagram of an exemplary system architecture for implementing the features and operations of FIGS. 1-6. Other architectures are possible, including architectures with more or fewer components. In some implementations, architecture 700 includes one or more processors 702 (e.g., dual-core Intel® Xeon® Processors), one or more output devices 704 (e.g., LCD), one or more network interfaces 706, one or more input devices 708 (e.g., mouse, keyboard, touch-sensitive display) and one or more computer-readable mediums 712 (e.g., RAM, ROM, SDRAM, hard disk, optical disk, flash memory, etc.). These components can exchange communications and data over one or more communication channels 710 (e.g., buses), which can utilize various hardware and software for facilitating the transfer of data and control signals between components.

The term "computer-readable medium" refers to a medium that participates in providing instructions to processor 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 712 can further include operating system 714 (e.g., a Linux® operating system), network communication module 716, survey manager 720, location data manager 730, and location data processor 740. Operating system 714 can be multi-user, multiprocessing, multitasking, multithreading, real time, etc. Operating system 714 performs basic tasks, including but not limited to: recognizing input from and providing output to devices 706, 708; keeping track and managing files and directories on computer-readable mediums 712 (e.g., memory or a storage device); controlling peripheral devices; and managing traffic on the one or more communication channels 710. Network communications module 716 includes various components for establishing and maintaining network connections (e.g., software for implementing communication protocols, such as TCP/IP, HTTP, etc.).

Survey manager 720 can include computer instructions that, when executed, cause processor 702 to provide survey instructions to mobile devices for providing reference locations and detected signal sources to a location server, and receive survey data from the mobile devices. Location data manager 730 can include computer instructions that, when executed, cause processor 702 to store location data to and retrieve location data from a location database. Location data processor 740 can include computer instructions that, when executed, cause processor 702 to perform regression analysis on the location data and to update the location data.

Architecture 700 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch surface) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Exemplary Mobile Device Architecture

Figure 8:
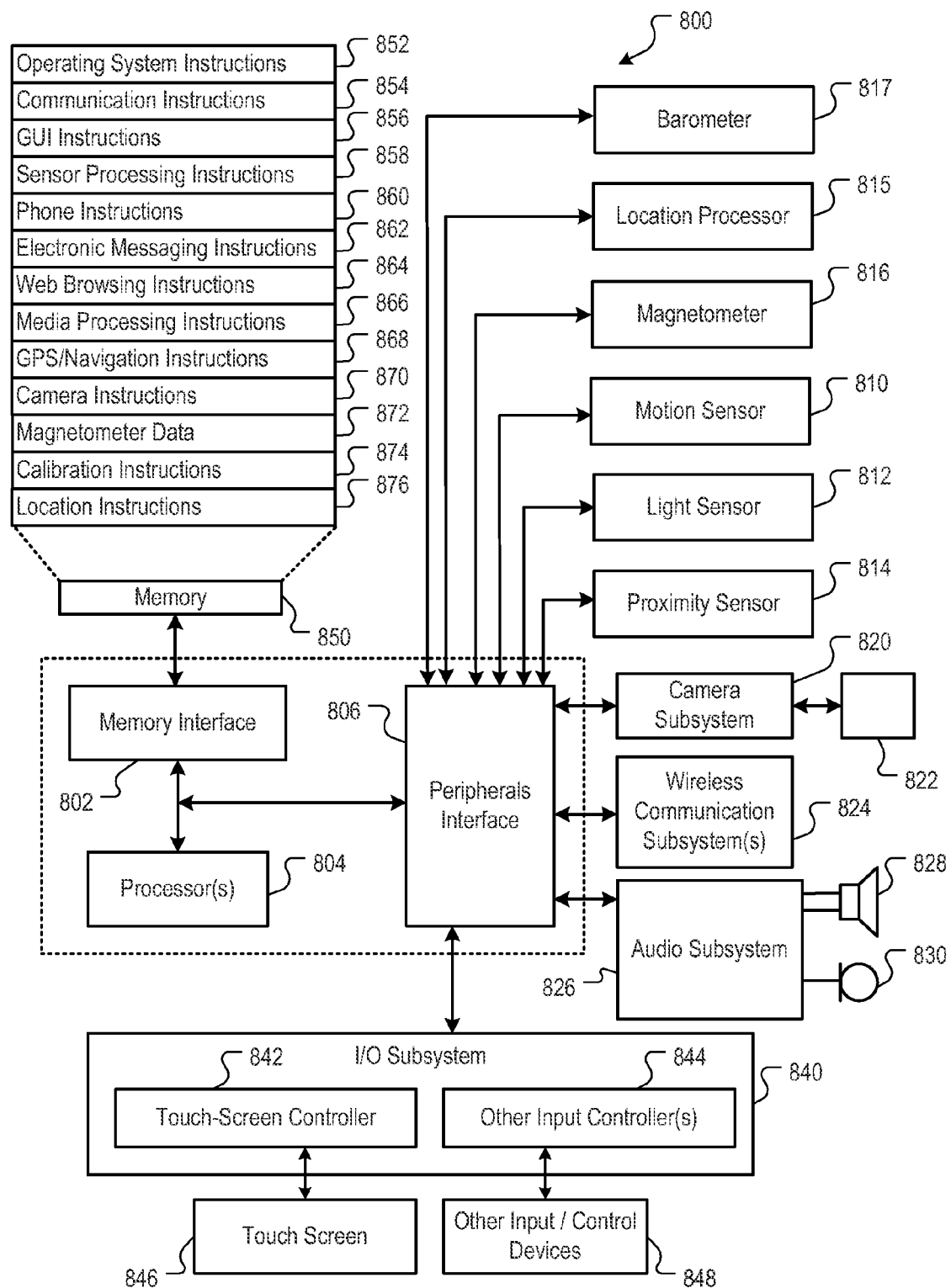
FIG. 8 is a block diagram illustrating an exemplary device architecture of a mobile device implementing the features and operations described in reference to FIGS. 1-6.

FIG. 8 is a block diagram of an exemplary architecture 800 for the mobile devices of FIGS. 1-6. A mobile device (e.g., mobile device 106) can include memory interface 802, one or more data processors, image processors and/or processors 804, and peripherals interface 806. Memory interface 802, one or more processors 804 and/or peripherals interface 806 can be separate components or can be integrated in one or more integrated circuits. Processors 804 can include application processors, baseband processors, and wireless processors. The various components in mobile device 106, for example, can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the mobile device. Location processor 815 (e.g., GPS receiver) can be connected to peripherals interface 806 to provide geopositioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass. Motion sensor 810 can include one or more accelerometers configured to determine change of speed and direction of movement of the mobile device. Barometer 817 can include one or more devices connected to peripherals interface 806 and configured to measure pressure of atmosphere around the mobile device.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which a mobile device is intended to operate. For example, a mobile device can include communication subsystems 824 designed to operate over a GSM network, a GPRS network, an EDGE network, a Wi-Fi™ or WiMax™ network, and a Bluetooth™ network. In particular, the wireless communication subsystems 824 can include hosting protocols such that the mobile device can be configured as a base station for other wireless devices.

Audio subsystem 826 can be coupled to a speaker 828 and a microphone 830 to facilitate voice-enabled functions, such as voice recognition, voice replication, digital recording, and telephony functions. Audio subsystem 826 can be configured to receive voice commands from the user.

I/O subsystem 840 can include touch screen controller 842 and/or other input controller(s) 844. Touch-screen controller 842 can be coupled to a touch screen 846 or pad. Touch screen 846 and touch screen controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 846.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In one implementation, a pressing of the button for a first duration may disengage a lock of the touch screen 846; and a pressing of the button for a second duration that is longer than the first duration may turn power to mobile device 106 on or off. The user may be able to customize a functionality of one or more of the buttons. The touch screen 846 can, for example, also be used to implement virtual or soft buttons and/or a keyboard.

In some implementations, mobile device 106 can present recorded audio and/or video files, such as MP3, AAC, and MPEG files. In some implementations, mobile device 106 can include the functionality of an MP3 player. Mobile device 106 may, therefore, include a pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; magnetometer data 872 and calibration instructions 874 to facilitate magnetometer calibration. The memory 850 may also store other software instructions (not shown), such as security instructions, web video instructions to facilitate web video-related processes and functions, and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 850. Memory 850 can include location instructions 876 that can be used to provide a location and a set of signal sources to a location server, and determine a location of the mobile device when the mobile device using location data received from the location server.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

Exemplary Operating Environment

Figure 9:
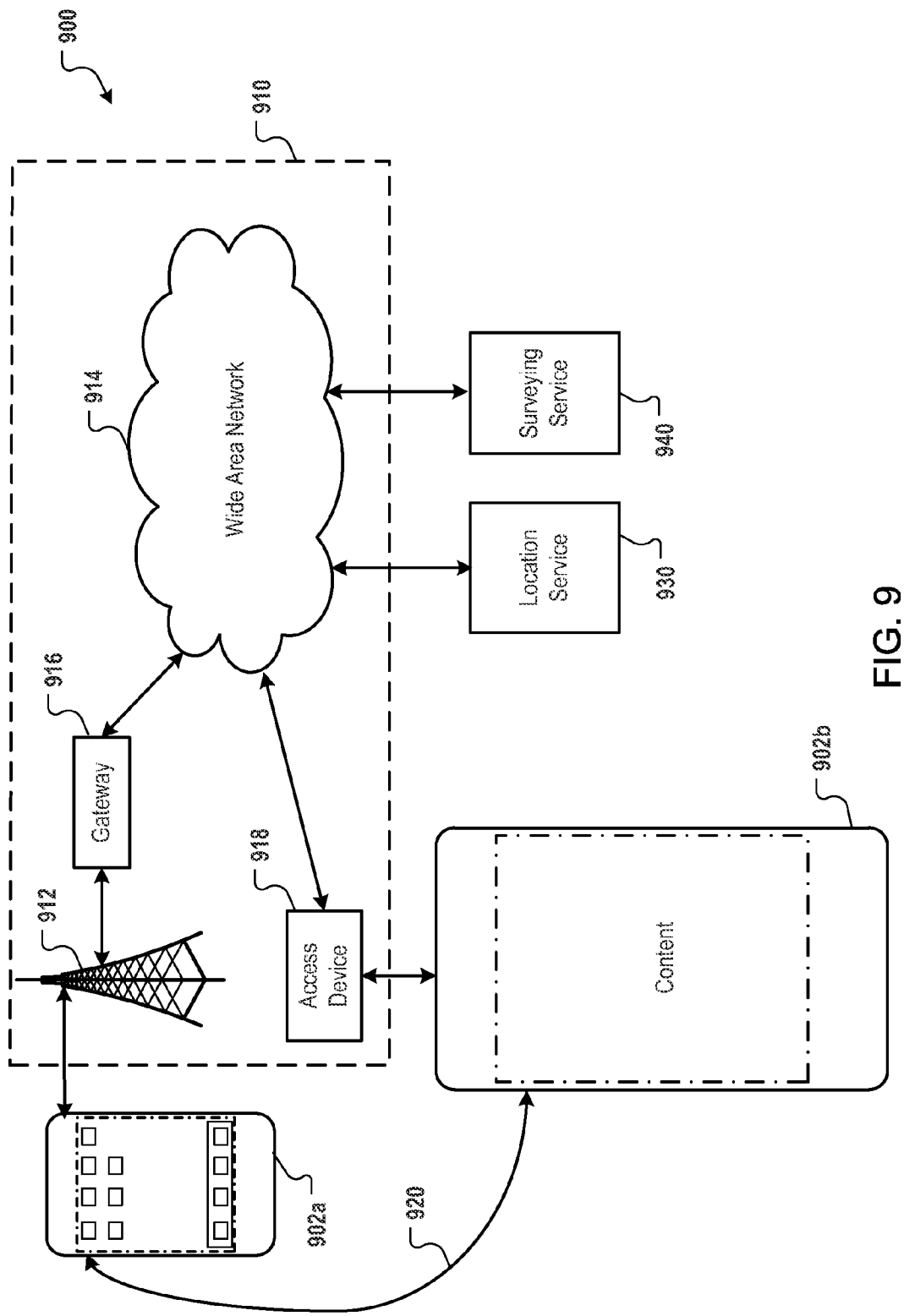
FIG. 9 is a block diagram of an exemplary network operating environment for the mobile devices of FIGS. 1-6.

FIG. 9 is a block diagram of an exemplary network operating environment 900 for the mobile devices of FIGS. 1-6. Mobile devices 902a and 902b can, for example, communicate over one or more wired and/or wireless networks 910 in data communication. For example, a wireless network 912, e.g., a cellular network, can communicate with a wide area network (WAN) 914, such as the Internet, by use of a gateway 916. Likewise, an access device 918, such as an 802.11g wireless access point, can provide communication access to the wide area network 914.

In some implementations, both voice and data communications can be established over wireless network 912 and the access device 918. For example, mobile device 902a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 912, gateway 916, and wide area network 914 (e.g., using Transmission Control Protocol/Internet Protocol (TCP/IP) or User Datagram Protocol (UDP)). Likewise, in some implementations, the mobile device 902b can place and receive phone calls, send and receive e-mail messages, and retrieve electronic documents over the access device 918 and the wide area network 914. In some implementations, mobile device 902a or 902b can be physically connected to the access device 918 using one or more cables and the access device 918 can be a personal computer. In this configuration, mobile device 902a or 902b can be referred to as a "tethered" device.

Mobile devices 902a and 902b can also establish communications by other means. For example, wireless device 902a can communicate with other wireless devices, e.g., other mobile devices, cell phones, etc., over the wireless network 912. Likewise, mobile devices 902a and 902b can establish peer-to-peer communications 920, e.g., a personal area network, by use of one or more communication subsystems, such as the Bluetooth™ communication devices. Other communication protocols and topologies can also be implemented.

The mobile device 902a or 902b can, for example, communicate with one or more services 930 and 940 over the one or more wired and/or wireless networks. For example, one or more location services 930 can provide location data to mobile devices 902a and 902b, provide updates of the location data, and provide algorithms for determining a location of mobile devices 902a and 902b. Surveying service 940 can provide instructions for mobile devices 902a and 902b to submit location and detected signal sources to a location server, when users of mobile devices 902a and 902b choose to participate in the survey.

Mobile device 902a or 902b can also access other data and content over the one or more wired and/or wireless networks. For example, content publishers, such as news sites, Really Simple Syndication (RSS) feeds, web sites, blogs, social networking sites, developer networks, etc., can be accessed by mobile device 902a or 902b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method performed by one or more computers, the method comprising:
   receiving, by a server and from a mobile device, a device location and a plurality of signal measurements, each signal measurement being a measurement of a signal from a different signal source;
   determining that, according to location data stored in a location database, a portion of signal sources are located in a signal source cluster, the signal source cluster being defined by a threshold number of the signal sources and a reliability threshold distance, wherein the signal source cluster comprises at least the threshold number of the signal sources located within the reliability threshold distance of one another;
   determining that a distance between the device location and a location of at least one signal source in the signal source cluster satisfies the reliability threshold distance;
   upon determining that the distance satisfies the reliability threshold distance, designating the device location as a trustworthy device location;
   determining that a first signal measurement of a first signal from a first signal source among the signal sources indicates a conflict between detection of the first signal and a signal source location of the first signal source as stored in the location data, including determining that the trustworthy device location is located outside of a maximum detection area surrounding the signal source location; and
   upon determining the conflict, designating the first signal source as an outlier signal source, including designating the signal source location of the first signal source as stored in the location database for update.

2. The method of claim 1, wherein:
   each signal source is one of a radio frequency (RF) signal source, a magnetic signal source, an audio signal source, a visual signal source, an air pressure source, or a heat source, and
   the device location is a geographic location of the mobile device determined based on one or more global satellite system signals received by the mobile device.

3. The method of claim 1, wherein the location data comprise an identifier of each signal source and an estimated location of each signal source.

4. The method of claim 3, wherein the estimated location is determined based on signal measurement previously received from one or more crowd-sourced mobile devices.

5. The method of claim 1, wherein the maximum detection area includes a geographic area where, if a signal source is located in the geographic area, signal from the signal source is detectable by the mobile device.

6. The method of claim 1, wherein the reliability threshold distance is an estimated reach of a signal from each signal source.

7. The method of claim 1, comprising preventing the outlier signal source from being used for calculating locations of mobile devices.

8. The method of claim 1, comprising:
   determining an estimated location of the mobile device using the signal measurements and the location data;
   determining that a distance between the estimated location and the received device location exceeds the reliability threshold; and
   designating the mobile device as a suspect mobile device.

9. The method of claim 8, comprising:
   preventing device locations received from the suspect mobile device from being used to estimate a location of a signal source.

10. A non-transitory computer-readable medium storing executable instructions to cause a server comprising one or more computers to perform operations comprising:
    receiving, from a mobile device, a device location and a plurality of signal measurements, each signal measurement being a measurement of signal from a different signal source;
    determining that, according to location data stored in a location database, that a portion of signal sources are located in a signal source cluster, the signal source cluster being defined by a threshold number of the signal sources and a reliability threshold distance, wherein the signal source cluster comprises at least the threshold number of the signal sources located within the reliability threshold distance of one another;
    determining that a distance between the device location and a location of at least one signal source in the signal source cluster satisfies the reliability threshold distance;
    upon determining that the distance satisfies the reliability threshold distance, designating the device location as a trustworthy device location;
    determining that a first signal measurement of a first signal from a first signal source among the signal sources indicates a conflict between detection of the first signal and a signal source location of the first signal source as stored in the location data, including determining that the trustworthy device location is located outside of a maximum detection area surrounding the signal source location; and
    upon determining the conflict, designating the first signal source of the signal sources as an outlier signal source, including designating the signal source location of the first signal source as stored in the location database for update.

11. The non-transitory computer-readable medium of claim 10, wherein:
    each signal source is one of a radio frequency (RF) signal source, a magnetic signal source, an audio signal source, a visual signal source, an air pressure source, or a heat source, and the device location is a geographic location of the mobile device determined based on one or more global satellite system signals received by the mobile device.

12. The non-transitory computer-readable medium of claim 10, wherein the location data comprise an identifier of each signal source and an estimated location of each signal source.

13. The non-transitory computer-readable medium of claim 12, wherein the estimated location is determined based on signal measurement previously received from one or more crowd-sourced mobile devices.

14. The non-transitory computer-readable medium of claim 10, wherein the maximum detection area includes a geographic area where, if a signal source is located in the geographic area, signal from the signal source is detectable by the mobile device.

15. The non-transitory computer-readable medium of claim 10, wherein the reliability threshold distance is an estimated reach of a signal from each signal source.

16. The non-transitory computer-readable medium of claim 10, the operations comprising preventing the outlier signal source from being used for calculating locations of mobile devices.

17. The non-transitory computer-readable medium of claim 10, the operations comprising:
determining an estimated location of the mobile device using the signal measurements and the location data;
determining that a distance between the estimated location and the received device location exceeds the reliability threshold; and
designating the mobile device as a suspect mobile device.

18. The non-transitory computer-readable medium of claim 17, the operations comprising:
preventing device locations received from the suspect mobile device from being used to estimate a location of a signal source.

19. A system comprising:
a server comprising one or more computers; and
a non-transitory computer-readable medium storing executable instructions to cause the server to perform operations comprising:
receiving, from a mobile device, a device location and a plurality of signal measurements, each signal measurement being a measurement of a signal from a different signal source;
determining that, according to location data stored in a location database, that a portion of signal sources are located in a signal source cluster, the signal source cluster being defined by a threshold number of the signal sources and a reliability threshold distance, wherein the signal source cluster comprises at least the threshold number of the signal sources located within the reliability threshold distance of one another;
determining that a distance between the device location and a location of at least one signal source in the signal source cluster satisfies the reliability threshold distance;
upon determining that the distance satisfies the reliability threshold distance, designating the device location as a trustworthy device location;
determining that a first signal measurement of a first signal from a first signal source among the signal sources indicates a conflict between detection of the first signal and a signal source location of the first signal source as stored in the location data, including determining that the trustworthy device location is located outside of a maximum detection area surrounding the signal source location; and
upon determining the conflict, designating a signal source of the signal sources as an outlier signal source, including designating the signal source a location of the first signal source as stored in the location database for update.

20. The system of claim 19, wherein:
each signal source is one of a radio frequency (RF) signal source, a magnetic signal source, an audio signal source, a visual signal source, an air pressure source, or a heat source, and
the device location is a geographic location of the mobile device determined based on one or more global satellite system signals received by the mobile device.

21. The system of claim 19, wherein the location data comprise an identifier of each signal source and an estimated location of each signal source.

22. The system of claim 21, wherein the estimated location is determined based on signal measurement previously received from one or more crowd-sourced mobile devices.

23. The system of claim 19, wherein the maximum detection area includes a geographic area where, if a signal source is located in the geographic area, signal from the signal source is detectable by the mobile device.

24. The system of claim 19, wherein the reliability threshold distance is an estimated reach of a signal from each signal source.

25. The system of claim 19, the operations comprising preventing the outlier signal source from being used for calculating locations of mobile devices.

26. The system of claim 19, the operations comprising:
determining an estimated location of the mobile device using the signal measurements and the location data;
determining that a distance between the estimated location and the received device location exceeds the reliability threshold; and
designating the mobile device as a suspect mobile device.

27. The system of claim 26, the operations comprising:
preventing device locations received from the suspect mobile device from being used to estimate a location of a signal source.

\* \* \* \* \*

UNITED STATES PATENT AND TRADEMARK OFFICE
CERTIFICATE OF CORRECTION

| | | |
|---|---|---|
| PATENT NO. | : 8,918,103 B2 | Page 1 of 1 |
| APPLICATION NO. | : 13/715413 | |
| DATED | : December 23, 2014 | |
| INVENTOR(S) | : Robert Mayor et al. | |

It is certified that error appears in the above-identified patent and that said Letters Patent is hereby corrected as shown below:

In the Claims

Column 16, Line 33 at Claim 10; replace:
"ment being a measurement of signal from a different" with
-- ment being a measurement of a signal from a different --

Column 18, Line 17 at Claim 19; replace:
"source, including designating the signal source a loca-" with
-- source, including designating the signal source loca- --

Signed and Sealed this
Fourteenth Day of April, 2015

Michelle K. Lee
*Director of the United States Patent and Trademark Office*